(12) United States Patent
Ohara

(10) Patent No.: US 7,580,361 B2
(45) Date of Patent: Aug. 25, 2009

(54) NETWORK SYSTEM, INFORMATION PROCESSOR AND ELECTRONIC APPARATUS

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1208 days.

(21) Appl. No.: 10/465,895

(22) Filed: Jun. 20, 2003

(65) Prior Publication Data

US 2004/0049578 A1 Mar. 11, 2004

(30) Foreign Application Priority Data

Jun. 21, 2002 (JP) ............... 2002-181684

(51) Int. Cl.
*G01R 31/08* (2006.01)
*G06F 11/00* (2006.01)
*G08C 15/00* (2006.01)
*H04J 1/16* (2006.01)

(52) U.S. Cl. ............... 370/241; 709/224; 701/1; 701/2; 701/29; 701/32; 701/37; 250/221; 342/50; 340/518; 340/825.72; 725/131; 180/197; 358/1.15; 710/113

(58) Field of Classification Search ............ 370/241, 370/238; 709/224; 701/1, 2, 29, 32, 37; 250/221; 342/50; 340/518, 825.12, 825.72; 725/131; 180/197; 358/1.15
See application file for complete search history.

(56) References Cited

U.S. PATENT DOCUMENTS

| 3,508,260 | A | * | 4/1970 | Stein ............... 342/50 |
| 3,927,404 | A | * | 12/1975 | Cooper ............ 340/518 |
| 5,448,724 | A | | 9/1995 | Hayashi |
| 5,761,603 | A | * | 6/1998 | Nojima et al. ....... 725/131 |
| 5,781,745 | A | * | 7/1998 | Ramelson et al. .... 710/113 |
| 6,138,249 | A | | 10/2000 | Nolet |
| 6,583,886 | B1 | * | 6/2003 | Ochiai ............ 358/1.15 |
| 6,988,026 | B2 | * | 1/2006 | Breed et al. ........ 701/29 |
| 7,089,099 | B2 | * | 8/2006 | Shostak et al. ...... 701/32 |
| 7,103,460 | B1 | * | 9/2006 | Breed ............. 701/29 |
| 7,164,117 | B2 | * | 1/2007 | Breed et al. ....... 250/221 |
| 7,313,467 | B2 | * | 12/2007 | Breed et al. ....... 701/1 |
| 7,379,800 | B2 | * | 5/2008 | Breed ............. 701/29 |
| 2004/0130442 | A1 | * | 7/2004 | Breed et al. ....... 340/443 |
| 2005/0046584 | A1 | * | 3/2005 | Breed ........... 340/825.72 |
| 2005/0192727 | A1 | * | 9/2005 | Shostak et al. ..... 701/37 |

(Continued)

FOREIGN PATENT DOCUMENTS

EP   1 059 766 A2   12/2000

(Continued)

*Primary Examiner*—William D Cumming
(74) *Attorney, Agent, or Firm*—Oliff & Berridge, PLC

(57) ABSTRACT

In the present network system, a printer 10 periodically transmits an update request at different timings respectively to an apparatus management PC 30 and to a directory service 50 which are monitoring apparatuses for monitoring network apparatuses (such as the printer 10). Each of the monitoring apparatuses 30, 50 determines a state of the printer 10 based on the update request from the printer 10. Especially in the present system, if the apparatus management PC 30 determines that the update request from the printer 10 is not received, it notifies the directory service 50 by transmitting a delete request. As a result, early detection of disconnection of the printer 10 by the directory service 50 is possible without causing substantial increase in the network traffic.

10 Claims, 13 Drawing Sheets

U.S. PATENT DOCUMENTS

| | | | |
|---|---|---|---|
| 2005/0273218 A1* | 12/2005 | Breed et al. | 701/2 |
| 2006/0025897 A1* | 2/2006 | Shostak et al. | 701/1 |
| 2006/0180371 A1* | 8/2006 | Breed et al. | 180/197 |
| 2006/0208169 A1* | 9/2006 | Breed et al. | 250/221 |
| 2006/0212193 A1* | 9/2006 | Breed | 701/29 |
| 2008/0075010 A1* | 3/2008 | Song | 370/238 |
| 2008/0091823 A1* | 4/2008 | Ito | 709/224 |

FOREIGN PATENT DOCUMENTS

| | | |
|---|---|---|
| EP | 1 089 492 A2 | 4/2001 |
| JP | A 7-21135 | 1/1995 |
| JP | A 9-64871 | 3/1997 |
| JP | A 11-313059 | 11/1999 |
| JP | A 2001-7807 | 1/2001 |
| JP | A 2001-43160 | 2/2001 |
| JP | A 2001-155022 | 6/2001 |
| JP | A 2001-337873 | 12/2001 |
| JP | A 2002-24107 | 1/2002 |
| WO | WO 02/060124 A2 | 8/2002 |

* cited by examiner

FIG. 2

| NAME | IP ADDRESS | MODEL | LAST UPDATE TIME | DESTINATION DIRECTORY SERVICE INFORMATION |
|---|---|---|---|---|
| PTR10 | 131.151.98.23 | PT-4000N | 12:13:45 | TYPE OF PROTOCOL, IP ADDRESS, ETC. |
| SCN15 | 131.151.98.45 | SC-1270N | 12:13:42 | TYPE OF PROTOCOL, IP ADDRESS, ETC. |
| PTR12 | 131.151.99.24 | PT-4000N | 12:11:19 | TYPE OF PROTOCOL, IP ADDRESS, ETC. |

NETWORK SYSTEM, INFORMATION PROCESSOR AND ELECTRONIC APPARATUS

BACKGROUND OF THE INVENTION i) Technical Field of the Invention

This invention relates to a state monitoring technique for apparatuses connected with a network.

ii) Description of the Related Art

Conventionally, there has been a technique for monitoring states of apparatuses on a network.

FIG. 13 is a block diagram illustrating a brief outline of communications exchanged in a conventional network system.

As shown in FIG. 13, this network system comprises a directory service 110 as a monitoring apparatus for monitoring states of apparatuses connected with the network. This directory service 110 manages information regarding a plurality of apparatuses (printer 120, in FIG. 13) to be managed, which are connected with the network, based on information received from the apparatuses, and supplies the managed information at the request of the other apparatuses. Thereby, when a user of a personal computer (hereinafter, referred to as client PC) 130 utilizing the directory service 110 intends to print printing data generated in the client PC 130 on a printer on the network, for example, it is possible for the user to search for a printer currently available from the information managed by the directory service 110 and to transmit the printing data to the searched printer 120.

This network system further comprises a personal computer (hereinafter, referred to as apparatus management PC) 140, as another monitoring apparatus different from the aforementioned directory service 110, having a function to manage specific apparatuses on the network. This apparatus management PC 140 manages information regarding a plurality of specific apparatuses (printer 120, in FIG. 13), which are connected with the network, based on information received from the specific apparatuses, and displays the managed information on a not shown display of the apparatus management PC 140 at the request of a user of the apparatus management PC 140.

The information which such monitoring apparatuses receive from the monitored apparatuses on the network includes information which the apparatus voluntarily transmits and information which the apparatus returns at the request from the monitoring apparatuses. At all events, the monitoring apparatuses can receive the information only when the monitored apparatuses are alive on the network. In other words, if the monitored apparatuses are disconnected from the network by being powered off or the like, it is natural that the information from the monitored apparatuses cannot be received.

In case of a personal computer which is powered off after shutdown operation, it can voluntarily transmit the information that it is going to be disconnected from the network when the shutdown operation is performed. On the other hand, in case of a general printer which is powered off all of a sudden without such shutdown operation, for example, it cannot voluntarily transmit the information that it is going to be disconnected from the network.

For the above reason, in the aforementioned conventional network system (FIG. 13), the printer 120 is designed to periodically transmit the information to the monitoring apparatuses, that is, to the directory service 110 and the apparatus management PC 140, respectively. Each of the monitoring apparatuses detects the disconnection of the monitored apparatus from the network at the time when it determines that the information to be received at regular intervals has not been received.

As described in the above, in this type of the network system, the information is transmitted from the monitored apparatus like a printer to the monitoring apparatuses per a predetermined timing. The more frequently the information is transmitted, the heavier the network traffic becomes. Therefore, the transmission frequency of the information is controlled to be low.

However, if the transmission frequency is set to be low, it may take long, from when the monitored apparatus like the printer is in fact powered off, for the monitoring apparatuses to detect the disconnection of the monitored apparatus from the network. If the detection takes long as such, there may be cases in which the monitored apparatus determined to be alive on the network by the monitoring apparatuses is no longer alive on the network. Thus, reliability of the information managed by the monitoring apparatuses is threatened.

SUMMARY OF THE INVENTION

One object of the present invention is to allow early detection of a state of an apparatus on a network by monitoring apparatuses without substantially increasing the network traffic.

In order to attain the above objects, a network system of the present invention comprises a plurality of monitoring apparatuses for determining a state of a monitored apparatus based on monitored apparatus information received from the monitored apparatus via a network at a predetermined timing. In the present network system, at least one monitoring apparatus (hereinafter, referred to as monitoring apparatus A) among the plurality of monitoring apparatuses, when it detects a change in the state of the monitored apparatus, transmits state information indicating the state of the monitored apparatus to another monitoring apparatus (hereinafter, referred to as monitoring apparatus B) which receives the monitored apparatus information from the monitored apparatus at a different timing from the timing at which the monitoring apparatus A receives the monitored apparatus information. The monitoring apparatus B which receives the state information determines the state of the monitored apparatus based on the monitored apparatus information and the state information. The phrase "different timing" mentioned herein means the respective timings are not exactly the same. For example, if the monitoring apparatus A and the monitoring apparatus B respectively receive the monitored apparatus information periodically at different intervals, it is considered that they receive the information at different timings. If they receive the information at the same intervals but asynchronously, it is also considered that they receive the information at different timings.

The network system constituted as above allows early detection of a change in the state of the monitored apparatus by the monitoring apparatus B without causing substantial increase in the network traffic.

In the conventional network system in which the state information is not transmitted from the monitoring apparatus A to the monitoring apparatus B, the monitoring apparatus B determines the state of the monitored apparatus only based on the monitored apparatus information from the monitored apparatus. Accordingly, if the interval at which the monitored apparatus information is received is long (in case that the monitored apparatus information is periodically received at regular intervals, for example, if the interval is long), it takes a lot of time to detect a change in the state of the monitored apparatus from when the actual change in the state takes place. However, simply shortening the interval at which the monitored apparatus information is received may cause substantial increase in the network traffic.

On the other hand, in the present network system, the monitoring apparatus B determines the state of the monitored apparatus based on both monitored apparatus information from the monitored apparatus and state information from the monitored apparatus A. Here, the monitored apparatus A detects a change in the state of the monitored apparatus at a different timing from the timing at which the monitoring apparatus B detects the change in the state of the monitored apparatus, and transmits the state information to the monitoring apparatus B. Accordingly, the monitoring apparatus B can detect the change in the state at a different timing from the timing at which the monitoring apparatus B detects the change in the state of the monitored apparatus from the monitored apparatus information. As a result, early detection of the change in the state of the monitored apparatus is possible. Moreover, it is not necessary to transmit the state information unless the state of the monitored apparatus is changed. Therefore, substantial increase in the network traffic is avoided.

The change in the state of the monitored apparatus can be detected as in the following, for example.

The monitoring apparatus A which transmits the state information transmits the state information of the monitored apparatus when it does not receive the monitored apparatus information which has been received at a predetermined timing from the monitored apparatus. The monitoring apparatus B which receives the state information determines that the monitored apparatus is disconnected from the network when it receives the state information or does not receive the monitored apparatus information which has been received at a predetermined timing from the monitored apparatus.

In other words, in this network system, the monitoring apparatus A detects disconnection of the monitored apparatus from the network by not receiving the periodic monitored apparatus information, and transmits the state information to the monitoring apparatus B. The monitoring apparatus B detects disconnection of the monitored apparatus from the network, which had been alive on the network, based on both monitored apparatus information and state information.

Such a network system allows early detection of disconnection of the monitored apparatus from the network by the monitoring apparatus B.

It is preferable that the monitored apparatus transmits destination apparatus information, indicating the monitoring apparatus B to which the state information should be transmitted, to a monitoring apparatus to which the monitored apparatus transmits the monitored apparatus information and which transmits the state information (that is, monitoring apparatus A). The monitoring apparatus A which transmits the state information transmits the state information to the monitoring apparatus B indicated in the destination apparatus information received from the monitored apparatus.

According to the above network system, the monitoring apparatus A can easily identify the monitoring apparatus B to which the state information of the monitored apparatus should be transmitted based on the destination apparatus information from the monitored apparatus. Accordingly, it is extremely advantageous, for example, in case of a network system in which each monitored apparatus is monitored by a different monitoring apparatus A.

Another aspect of the present invention provides an information processor for use as a monitoring apparatus in a network system comprising a plurality of monitoring apparatuses for determining a state of a monitored apparatus based on monitored apparatus information received from the monitored apparatus via the network at a predetermined timing. The information processor comprises a receiving device that receives information via the network, and a detecting device that detects a change in the state of the monitored apparatus based on the monitored apparatus information from the monitored apparatus received from the receiving device. It also comprises a transmitting device that transmits state information indicating the detected state of the monitored apparatus to another monitoring apparatus which receives the monitored apparatus information from the monitored apparatus at a different timing from the timing at which the information processor receives the monitored apparatus information, when the detecting device detects a change in the state of the monitored apparatus. If such an information processor is used as the monitoring apparatus A in the aforementioned network system, the same effect as mentioned above can be obtained.

Another aspect of the present invention also provides an information processor for use as a monitoring apparatus in the network system as described above. The information processor comprises a receiving device that receives information via the network, and a determining device that determines a state of a monitored apparatus based on state information indicating the state of the monitored apparatus transmitted from another monitoring apparatus which receives the monitored apparatus information from the monitored apparatus at a different timing from the timing at which the information processor receives the monitored apparatus information. If such an information processor is used as the monitoring apparatus B in the aforementioned network system, the same effect as mentioned above can be obtained.

Further another aspect of the present invention provides an electronic apparatus for use as a monitored apparatus in a network system comprising a plurality of monitoring apparatuses which determine a state of the monitored apparatus based on monitored apparatus information received from the monitored apparatus via the network at a predetermined timing. When at least one monitoring apparatus among the plurality of monitoring apparatuses detects a change in the state of the monitored apparatus, it transmits state information indicating the state of the monitored apparatus to another monitoring apparatus. The monitoring apparatus which receives the state information determines the state of the monitored apparatus based on the monitored apparatus information and the state information. The electronic apparatus comprises a monitored apparatus information transmitting device that transmits the monitored apparatus information at different timings to the monitoring apparatus which transmits the state information and to the monitoring apparatus which receives the state information. If such an electronic apparatus is used as the monitored apparatus in the aforementioned network system, the same effect as mentioned above can be obtained.

It is preferable that the electronic apparatus further comprises destination apparatus information transmitting device that transmits destination apparatus information, indicating the monitoring apparatus to which the state information should be transmitted, to the monitoring apparatus to which the monitored apparatus information transmitting device transmits the monitored apparatus information and which transmits the state information. Then, the monitoring apparatus which transmits the state information can easily identify to which monitoring apparatus the state information should be transmitted.

BRIEF DESCRIPTION OF THE DRAWING

The invention will now be described, by way of example, with reference to the accompanying drawings, in which:

FIG. 2 is an explanatory view of an apparatus management database;

DETAILED DESCRIPTION OF PREFERRED EMBODIMENT

Figure 1:
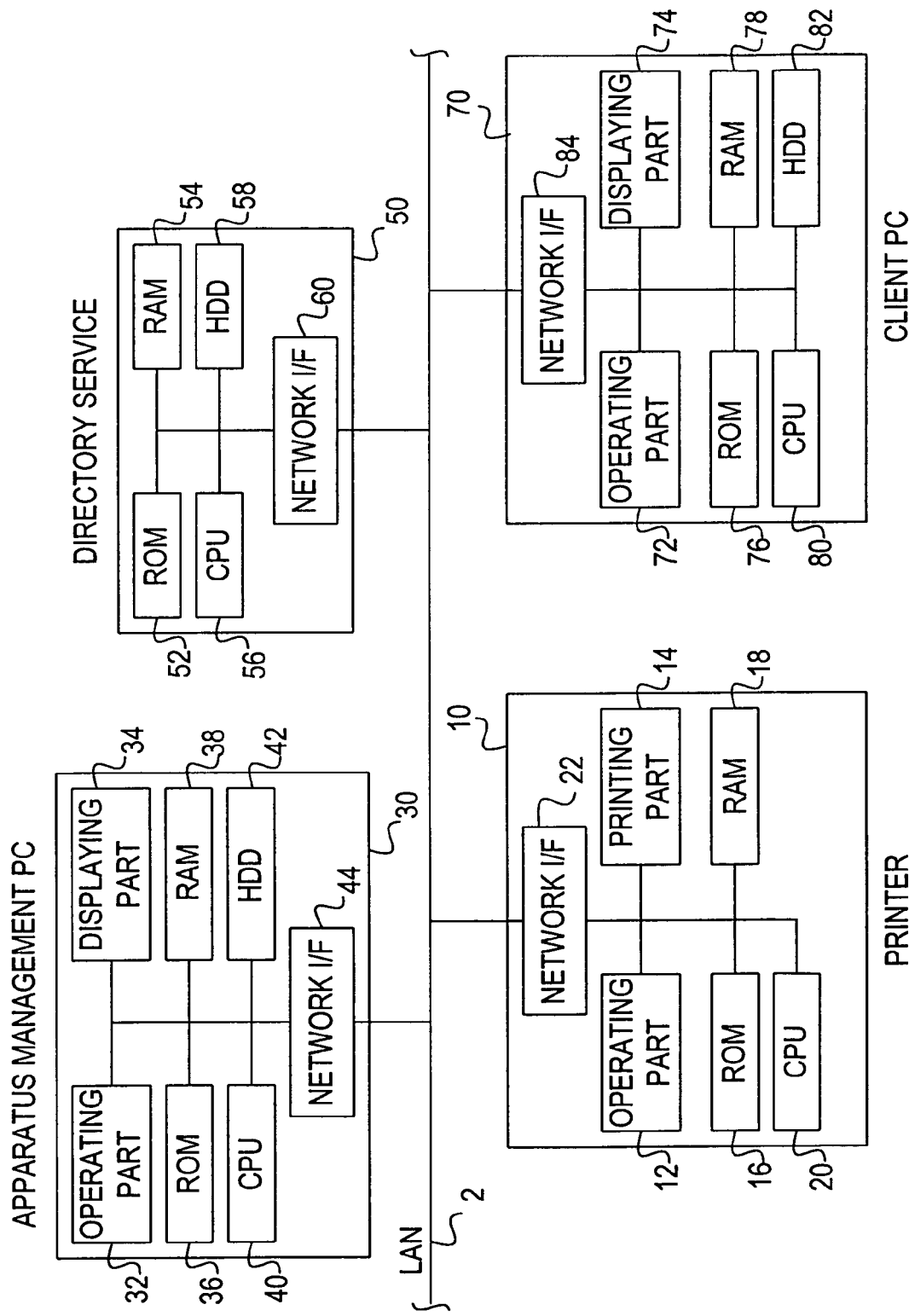
FIG. 1 is a block diagram showing a constitution of a network system of an embodiment.

A network system shown in FIG. 1 comprises a directory service 50, an apparatus management PC 30, and a client PC 70. The directory service 50 monitors a state of an apparatus to be managed connected to a LAN (local area network) 2. The apparatus management PC 30 is a personal computer comprising an apparatus managing function of monitoring a state of a specific apparatus among apparatuses connected to the LAN 2. The client PC 70 is also a personal computer which utilizes the information managed by the directory service 50. In the present system, there are apparatuses monitored by both of the directory service 50 and the apparatus management PC 30. FIG. 1 shows a printer 10 as one of the monitored apparatuses.

The printer 10 comprises an operating part 12 for accepting an external input, a printing part 14 for printing on paper, known ROM 16, RAM 18, CPU 20 and network interface 22.

The apparatus management PC 30 comprises an operating part 32 for accepting an external input, a displaying part 34 for displaying information, known ROM 36, RAM 38, CPU 40, hard disk 42 and network interface 44. In the hard disk 42 of the apparatus management PC 30, a database (hereinafter, referred to as apparatus management database) for managing information regarding specific apparatuses (specific printer and scanner, for example), among the apparatuses connected to the LAN 2, which are monitored by the apparatus management PC 30 is stored, as shown in FIG. 2. Particularly, names, IP addresses (Internet Protocol address) and models of the respective monitored apparatuses are stored as the information regarding the monitored apparatuses. Moreover, information such as types of protocols and IP addresses used for communications with directory services with which the monitored apparatuses communicate are also stored in the apparatus management database as information regarding the directory services (corresponding to the destination apparatus information).

The directory service 50 comprises known ROM 52, RAM 54, CPU 56, hard disk 58 and network interface 60. In the hard disk 58 of the directory service 50, a not shown database (hereinafter, referred to as DS database) for managing information regarding apparatuses to be managed by the directory service 50 is stored, as in the same way as in the apparatus management PC 30. Contents of the information managed by the DS database are almost the same as those managed by the apparatus management database (FIG. 2). However, the DS database does not include the information regarding the directory services (information in the right end row of the apparatus management database shown in FIG. 2) with which the apparatus communicates.

The client PC 70 comprises an operating part 72 for accepting external input operation, a displaying part 74 for displaying information, known ROM 76, RAM 78, CPU 80, hard disk 82 and network interface 84.

The printer 10, apparatus management PC 30, directory service 50 and client PC 70 are connected to the LAN 2 via the respective network interfaces 22, 44, 60 and 84.

Figure 3:
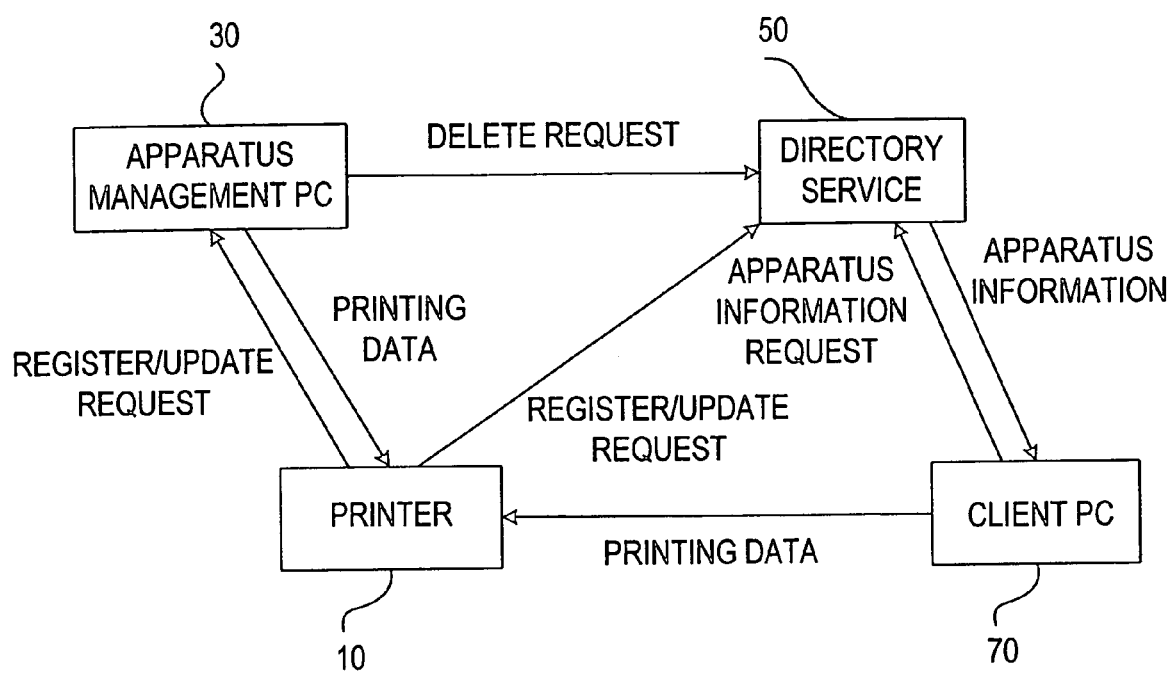
FIG. 3 is a block diagram illustrating a brief outline of communications exchanged in the network system of the embodiment.

A brief outline of communications exchanged in the present network system is hereafter explained by way of FIG. 3.

In the present system, the printer 10 periodically transmits information (update request) to the apparatus management PC 30 and to the directory service 50, respectively. The apparatus management PC 30 and directory service 50 respectively determine the state of the printer 10 based on the information received from the printer 10 periodically. The information managed by the apparatus management PC 30 is used by a user of the apparatus management PC 30, and the information managed by the directory service 50 is used by a user of the client PC 70. Particularly, in the present system, when the apparatus management PC 30 detects disconnection of the printer 10 from the network, it transmits a disconnection notice (delete request) to the directory service 50. Not shown apparatuses, other than the printer 10, which are monitored by both directory service 50 and apparatus management PC 30 perform the same process as the printer 10. As a result, the apparatus management PC 30 and the directory service 50 determine states of the plurality of monitored apparatuses based on the information transmitted from the respective apparatuses.

From now on, particular processes performed by the respective components of the present network system are described.

Figure 4:
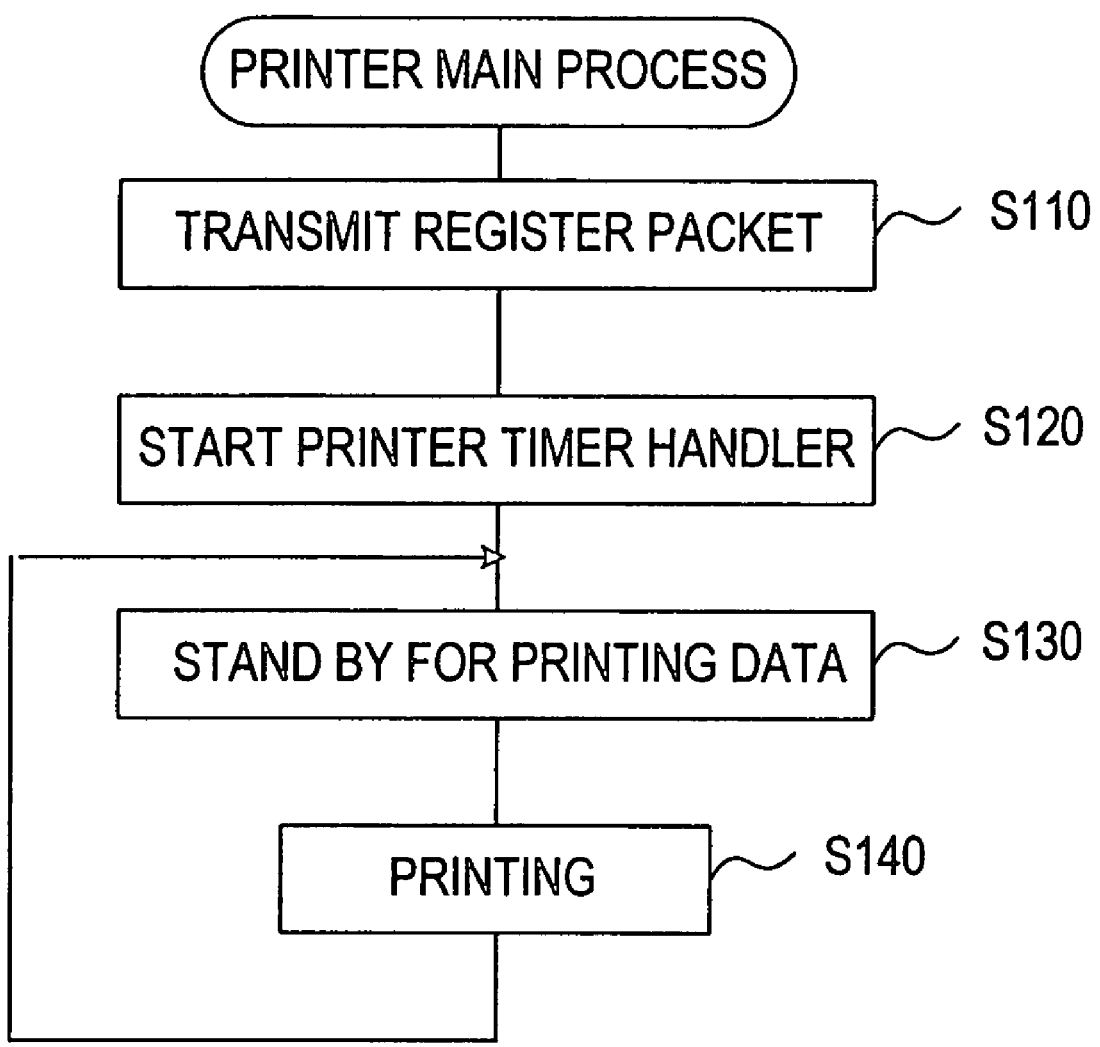
FIG. 4 is a flowchart of a printer main process.

First of all, a printer main process performed by the CPU 20 of the printer 10 is described by way of a flowchart shown in FIG. 4. The printer main process is started when the printer 10 is powered on.

When the printer main process is started, a packet for requesting registration (hereinafter, referred to as register packet) is transmitted via the network interface 22 to the apparatus management PC 30 and to the directory service 50, respectively, to notify them that the printer 10 is newly connected to the network in step S110. The transmitted register packet contains information of the name, IP address and model of the printer 10. The register packet transmitted to the apparatus management PC 30 also contains information regarding the directory service 50 with which the printer 10 communicates, such as the type of protocol to be used for communication, the IP address of the directory service 50, a signal for determining deletion of the printer 10 from the network which may be sent from printer 10 to the apparatus management PC 30 when the printer 10 is about to be disconnected from the network, etc.

In step S120, a later-explained printer timer handler process (FIG. 5) is started.

In step S130, the CPU 20 of the printer 10 stands by until printing data is transmitted from the other apparatuses (client PC 70 or apparatus management PC 30 in FIGS. 1 and 3) via the network interface 22. When printing data is received, the process proceeds to step S140.

In step S140, a known printing process for printing an image represented by the transmitted printing data by the printing part 14 is performed, and the process returns to step S130.

Figure 5:
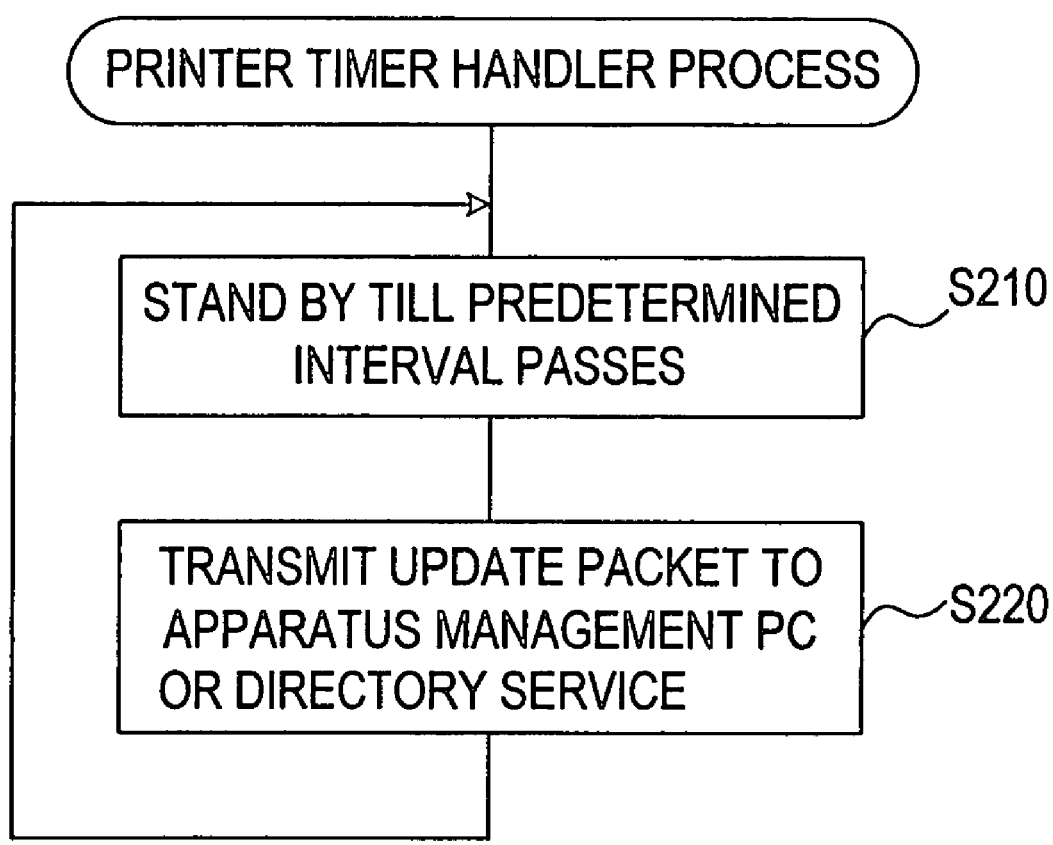
FIG. 5 is a flowchart of a printer timer handler process.

Now, a printer timer handler process performed by the CPU 20 of the printer 10 is described by way of a flowchart in FIG. 5. The printer timer handler process is started in step S120 of the aforementioned printer main process (FIG. 4), and is executed in parallel with the printer main process from then on.

When the printer timer handler process is started, the CPU 20 of the printer 10 stands by for a predetermined interval in step S210. After the interval, the process proceeds to step S220. Particularly, when the CPU 20 is notified of passing of sixty seconds or thirty minutes by a first timer and a second timer which respectively keep sixty seconds and thirty minutes repeatedly, the process proceeds to step S220. In the present embodiment, the first and second timers start keeping time when the printer timer handler process is started. As to the second timer, only the time kept for the first time is set to be thirty seconds shorter than the normal time to be kept of thirty minutes (that is, the time will be notified after twenty-nine minutes and thirty seconds from the start of the timekeeping). In this manner, the second timer is set as if it is started thirty seconds earlier than the start of the first timer, and thereafter, the notification of time by the second timer is performed at a different timing from the timing by the first timer (at a timing that is thirty seconds faster than the first timer).

In step S220, a packet for requesting updating (which corresponds to the monitored apparatus information; hereinafter, referred to as update packet) is transmitted to the apparatus management PC 30 or the directory service 50 via the network interface 22 to notify it that the printer 10 is alive on the network. Then, the process returns to step S210. The destination of the update packet depends on which of the first timer and the second timer triggers the move from step S210 to S220. That is, if the process moves from step S210 to S220 by the notification of passing of sixty seconds by the first timer, the update packet is transmitted to the apparatus management PC 30. If the process moves from step S210 to S220 by the notification of passing of thirty minutes by the second timer, the update packet is transmitted to the directory service 50. Thereby, the update packet is transmitted to the apparatus management PC 30 per sixty seconds, and to the directory service 50 per thirty minutes. Contents of the information contained in the update packet transmitted to the respective destinations are the same as the information contained in the aforementioned register packet transmitted to the respective destinations.

The processes similar to the printer main process (FIG. 4) and the printer timer handler process (FIG. 5) as described above are performed by not shown apparatuses which are monitored by both of the directory service 50 and the apparatus management PC 30.

Figure 6:
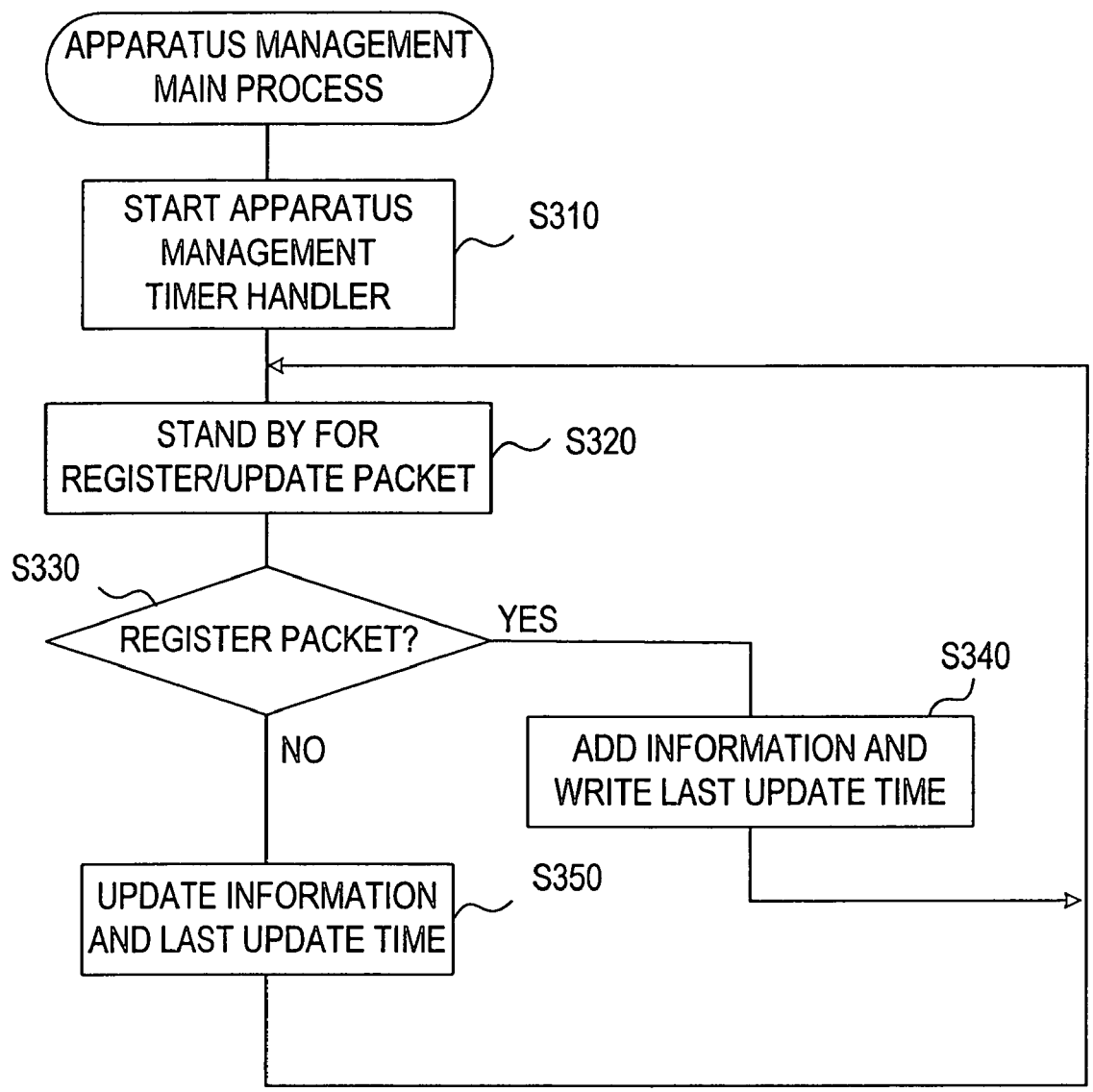
FIG. 6 is a flowchart of an apparatus management main process.

An apparatus management main process performed by the CPU 40 of the apparatus management PC 30 is hereafter described by way of a flowchart in FIG. 6.

When the apparatus management main process is started, a later explained apparatus management timer handler process (FIG. 7) is started in step S310.

In step S320, the CPU 30 of the apparatus management PC 30 stands by until it receives the register packet or update packet from the monitored apparatuses (printer 10 in FIGS. 1 and 3) via the network interface 44. When it receives one of the packets, the process proceeds to step S330.

In step S330, it is determined whether the received packet is the register packet.

If it is determined that the received packet is the register packet in step S330, the process moves to step S340. The information contained in the register packet, such as the name, IP address and model of the monitored apparatus and the information such as the type of protocol, IP address, etc. of the directory service 50 with which the monitored apparatus communicates are newly added to the apparatus management database (FIG. 2) stored in the hard disk 42, as information regarding the monitored apparatus which transmitted the register packet. Furthermore, the current time is written to the hard disk 42 as the last update time, and the process returns to step S320.

On the other hand, if it is determined that the received packet is not the register packet (that is, it is the update packet) in step S330, the process moves to step S350. In step S350, the information already stored for the monitored apparatus which transmitted the update packet, among the information in the apparatus management database, is updated to the information contained in the update packet and the last update time is also updated. Then, the process returns to step S320. For which apparatus, among the apparatuses registered in the apparatus management database, the update packet is sent can be determined by checking whether the IP addresses coincide.

Figure 7:
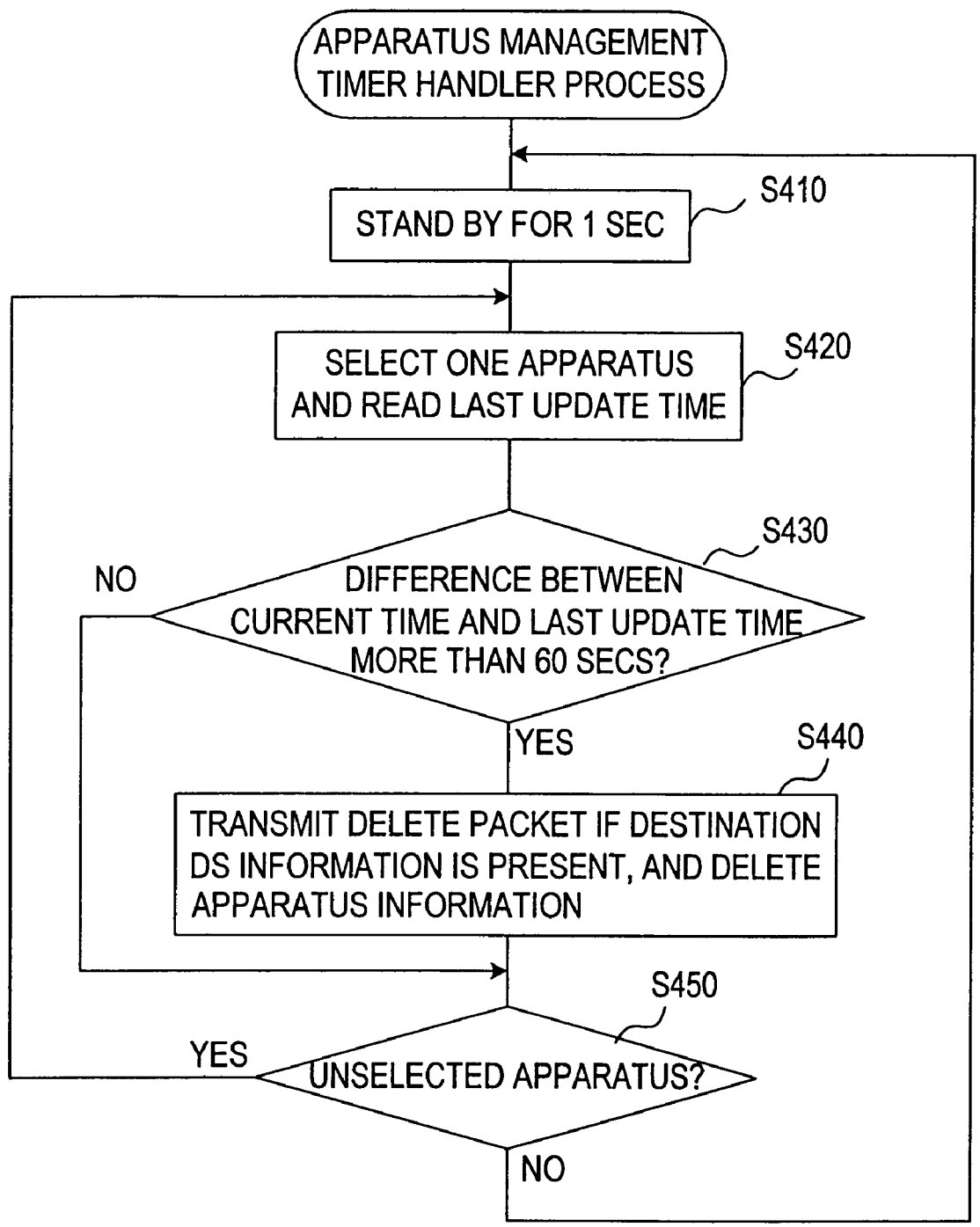
FIG. 7 is a flowchart of an apparatus management timer handler process.

The apparatus management timer handler process performed by the CPU 40 of the apparatus management PC 30 is now described by way of a flowchart in FIG. 7. The apparatus management timer handler process is started in step S310 of the aforementioned apparatus management main process (FIG. 6), and is executed in parallel with the apparatus management main process from then on.

When the apparatus management timer handler process is started, the CPU 40 stands by for one second in step S410. Then, the process proceeds to step S420.

In step S420, one of the apparatuses registered in the apparatus management database is selected, and the last update time for the apparatus is read out.

In step S430, it is determined whether a difference between the current time and the last update time read in step S420 is more than sixty seconds. That is, it is determined whether the currently selected apparatus is disconnected from the network by checking whether sixty seconds have passed since the last update time. In the present embodiment, the determination is made based on whether sixty seconds which correspond to a transmission cycle of the update packet have passed since the last update time. However, the determination can be made based on whether the time more than the transmission cycle of the update packet (seventy seconds, for example) has passed since the last update time in order to avoid erroneous determination. Appropriate time may be set depending on the particular constitution of the network system.

If it is determined that the difference between the current time and the last update time read is more than sixty seconds in step S430, the process proceeds to step S440. In step S440, if information regarding the destination directory service of the apparatus is contained in the information regarding the currently selected apparatus, the CPU 40 of the apparatus management PC 30 transmits a packet for requesting deletion (which corresponds to the state information; hereinafter, referred to as delete packet), on behalf of the currently selected apparatus, to notify the destination directory service of disconnection of the selected apparatus from the network. The delete packet is the same as a packet transmitted by an apparatus to be turned off after shutdown operation when the shutdown operation is performed. In this step S440, the information regarding the currently selected apparatus is also removed from the apparatus management database. Then, the process proceeds to step S450. When the information regarding the apparatus does not contain the information regarding the destination directory service with which the apparatus communicates, it means that the apparatus is only monitored by the apparatus management PC 30, for example.

On the other hand, if it is determined that the difference between the current time and the last update time read is equal to or less than sixty seconds, the process moves to step S450.

In step S450, it is determined whether there is any unselected apparatus among the apparatuses registered in the apparatus management database.

If it is determined that there are any unselected apparatuses in step S450, the process returns to step S420. After selecting one of the unselected apparatuses, the CPU 40 repeats the aforementioned steps (S430 and S440).

On the other hand, if it is determined that there is no unselected apparatus in step S450, the process returns to step S410.

In other words, in this apparatus management timer handler process, whether each of the apparatuses is alive on the network is determined by determining per a second whether the update packet periodically (per sixty seconds) transmitted from the respective apparatuses registered in the apparatus management database is received.

Figure 8:
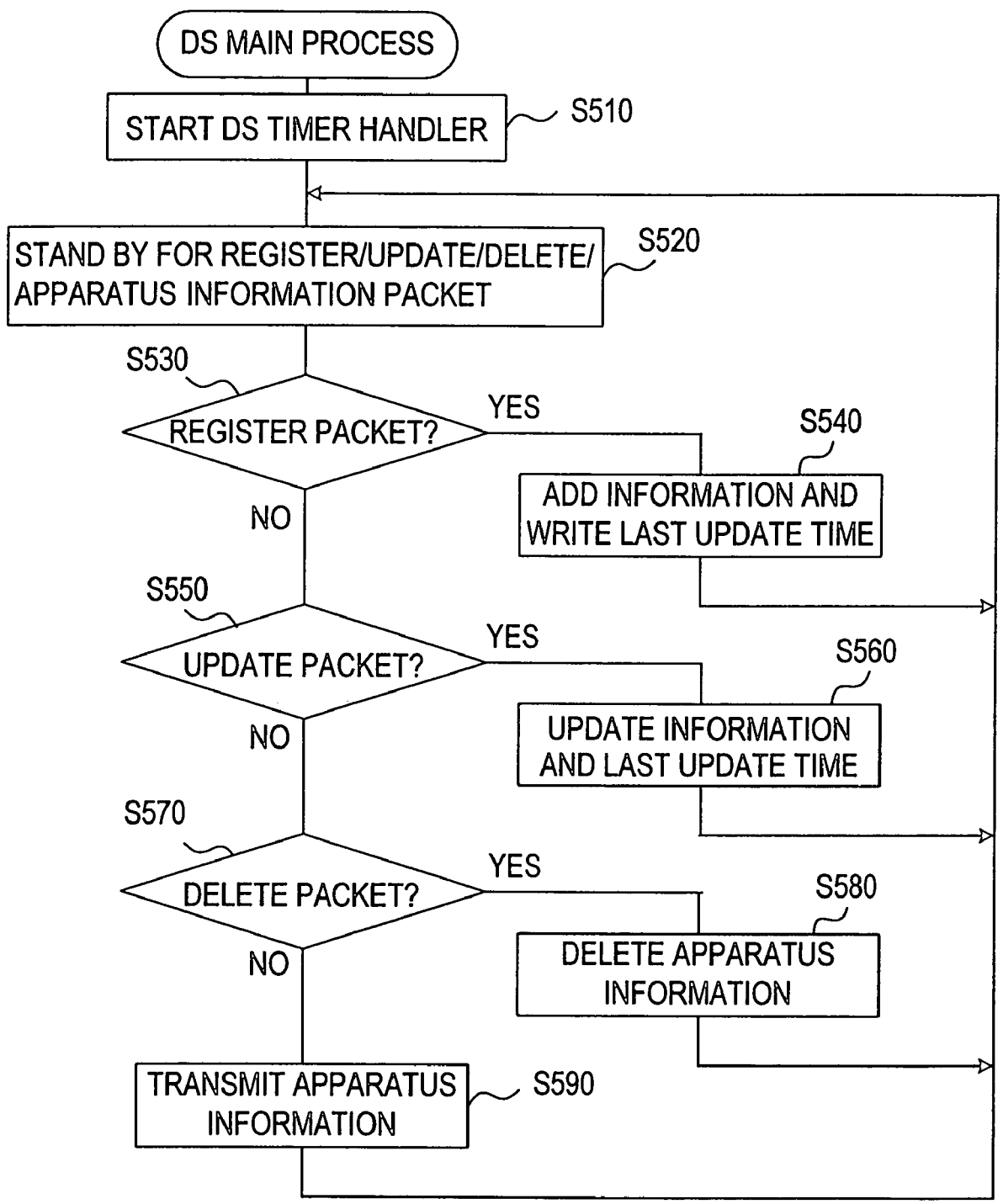
FIG. 8 is a flowchart of a DS main process.

Now, a DS main process performed by the CPU 56 the directory service 50 is described by way of a flowchart in FIG. 8.

When the DS main process is started, a later explained DS timer handler process (FIG. 9) is started in step S510.

In step S520, the CPU 56 of the directory service 50 stands by until it receives the register or update packet from the monitored apparatus (printer 10 in FIGS. 1 and 3), delete packet from the monitored apparatus or the apparatus management PC 30, or a packet requesting the apparatus information (hereinafter, referred to as apparatus information packet) from an apparatus (client PC 70, in FIGS. 1 and 3) utilizing the directory service 50 via the network interface 60. If any of the packets is received, the process proceeds to step S530. The apparatus information packet is a packet transmitted from the outside to obtain the apparatus information managed by the directory service 50.

In step S530, it is determined whether the received packet is the register packet.

If it is determined that the received packet is the register packet in step S530, the process proceeds to step S540. The name, IP address and model contained in the register packet is newly added to a DS database (not shown) stored in the hard disk 58 as information regarding the apparatus which transmitted the register packet. After the current time is written to the DS database as the last update time, the process returns to step S520.

On the other hand, if it is determined that the received packet is not the register packet in step S530, the process moves to step S550, and it is determined whether the received packet is the update packet.

If it is determined that the received packet is the update packet in step S550, the process proceeds to step S560. In step S560, the information already stored regarding the apparatus which transmitted the update packet, among the information in the DS database, is updated to the information contained in the update packet, and the last update time is also updated. Then, the process returns to step S520.

On the other hand, if it is determined that the received packet is not the update packet in step S550, the process moves to step S570. It is determined whether the received packet is the delete packet.

If it is determined that the received packet is the delete packet in step S570, the process proceeds to step S580. In step S580, the information regarding the apparatus which is determined disconnected from the network based on the delete packet is removed from the DS database. The process returns to step S520.

On the other hand, if it is determined that the received packet is not the delete packet (that is, it is the apparatus information packet) in step S570, the process moves to step S590. The information requested by the apparatus information packet is transmitted to the apparatus which transmitted the packet via the network interface 60. The process returns to step S520.

Figure 9:
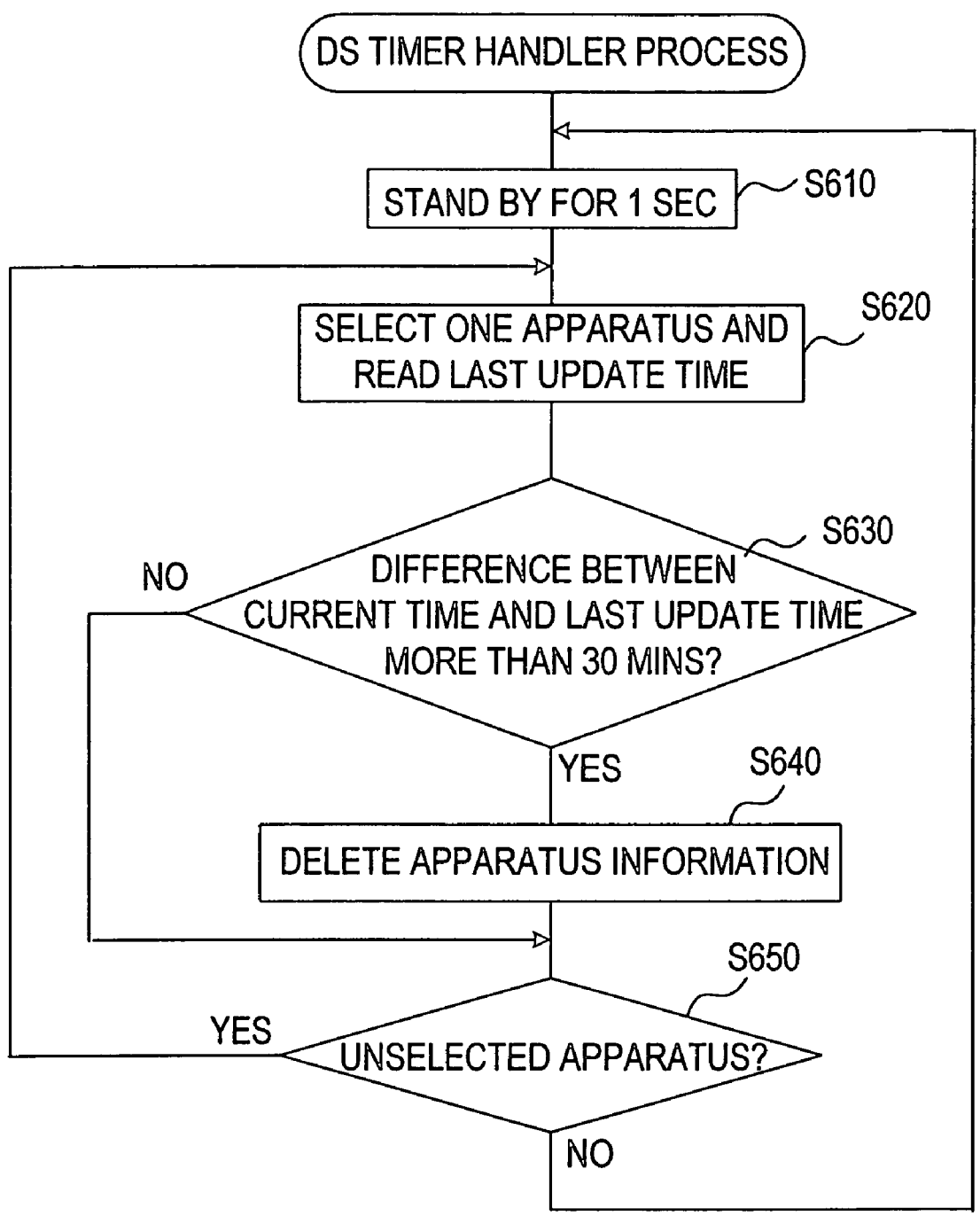
FIG. 9 is a flowchart of a DS timer handler process.

A DS timer handler process performed by the CPU 56 of the directory service 50 is described from now on by way of a flowchart in FIG. 9. The DS timer handler process is started in step S510 of the aforementioned DS main process (FIG. 8), and is executed in parallel with the DS main process from then on.

When the DS timer handler process is started, the CPU 56 of the directory service 50 stands by for one second in step S610. Then the process proceeds to step S620.

In step S620, one of the apparatuses registered in the DS database is selected, and the last update time regarding the apparatus is read out.

In step S630, it is determined whether a difference between the current time and the last update time read in step S620 is more than thirty minutes.

If it is determined that the difference between the current time and the last update time is more than thirty minutes in step S630, the process proceeds to step S640. The CPU 56 of the directory service 50 removes the information regarding the apparatus currently selected, and the process proceeds to step S650. In other words, whether the currently selected apparatus is disconnected from the network is determined by whether thirty minutes have passed since the last update time.

On the other hand, if it is determined that the difference between the current time and the last update time is equal to or less than thirty minutes, the process moves to step S650.

In step S650, it is determined whether there is any unselected apparatus among the apparatuses registered in the DS database.

If it is determined that there are any unselected apparatuses in step S650, the process returns to step S620. After selecting one of the unselected apparatuses, the CPU 56 of the directory service 50 repeats the aforementioned steps (S630 and S640).

On the other hand, if it is determined that there is no unselected apparatus, the process returns to step S610.

In other words, in this DS timer handler process, whether each of the apparatuses is alive on the network is determined by determining per a second whether the update packet periodically (per thirty minutes) transmitted from the respective apparatuses registered in the DS database is received.

Figure 10:
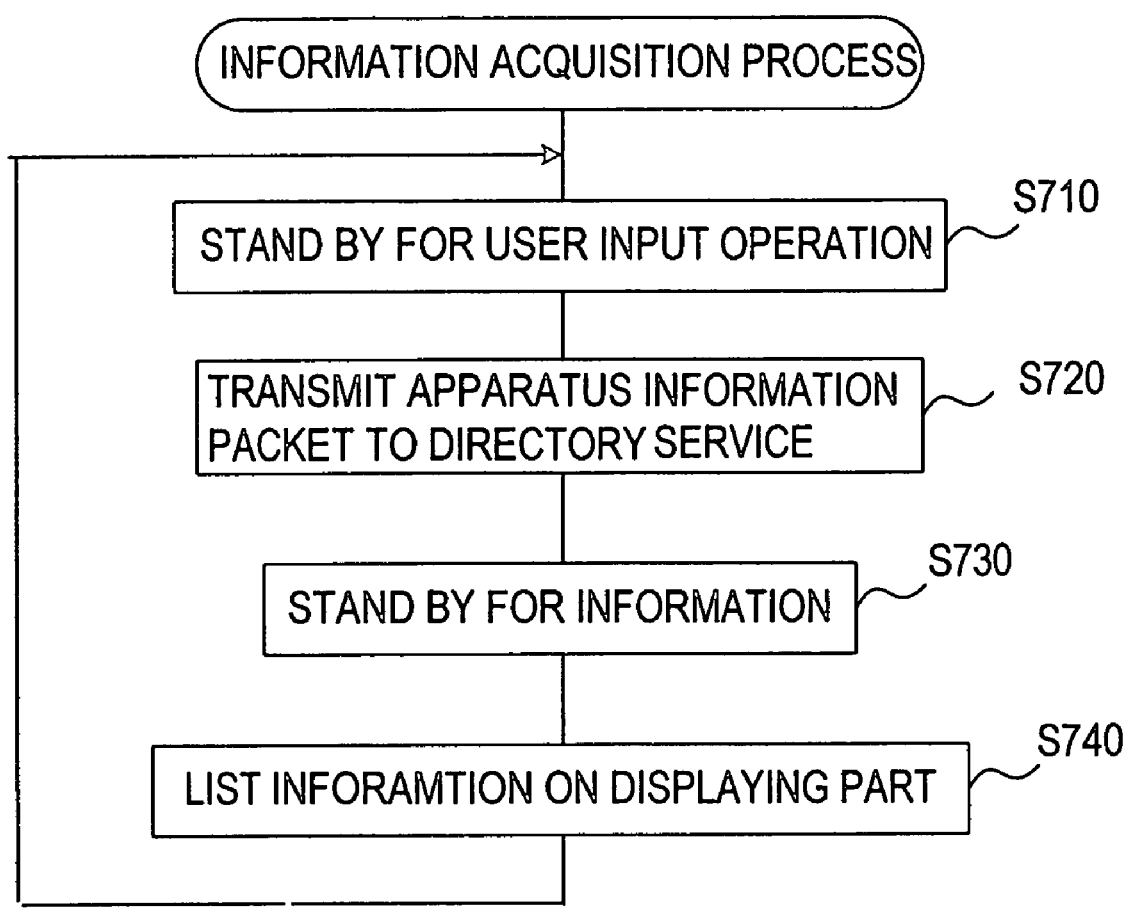
FIG. 10 is a flowchart of an information acquisition process.

An information acquisition process performed by the CPU 80 of the client PC 70 is hereafter described by way of a flowchart in FIG. 10.

When the information acquisition process is started, the CPU 80 of the client PC 70 stands by until input operation by a user to obtain information regarding an apparatus is performed in the operating part 72 in step S710. When this input operation is performed, the process proceeds to step S720.

In step S720, the apparatus information packet which corresponds to the request from the user is transmitted to the directory service 50 via the network interface 84. The request from the user may be, for example, to obtain information regarding a color printer currently alive on the network.

In step S730, the CPU 80 of the client PC 70 stands by until it receives the information from the directory service 50 in response to the apparatus information packet transmitted in step S720. When the information is received, the process proceeds to step S740.

In step S740, the received information is listed on the displaying part 74. The process returns to step S710.

Figure 11:
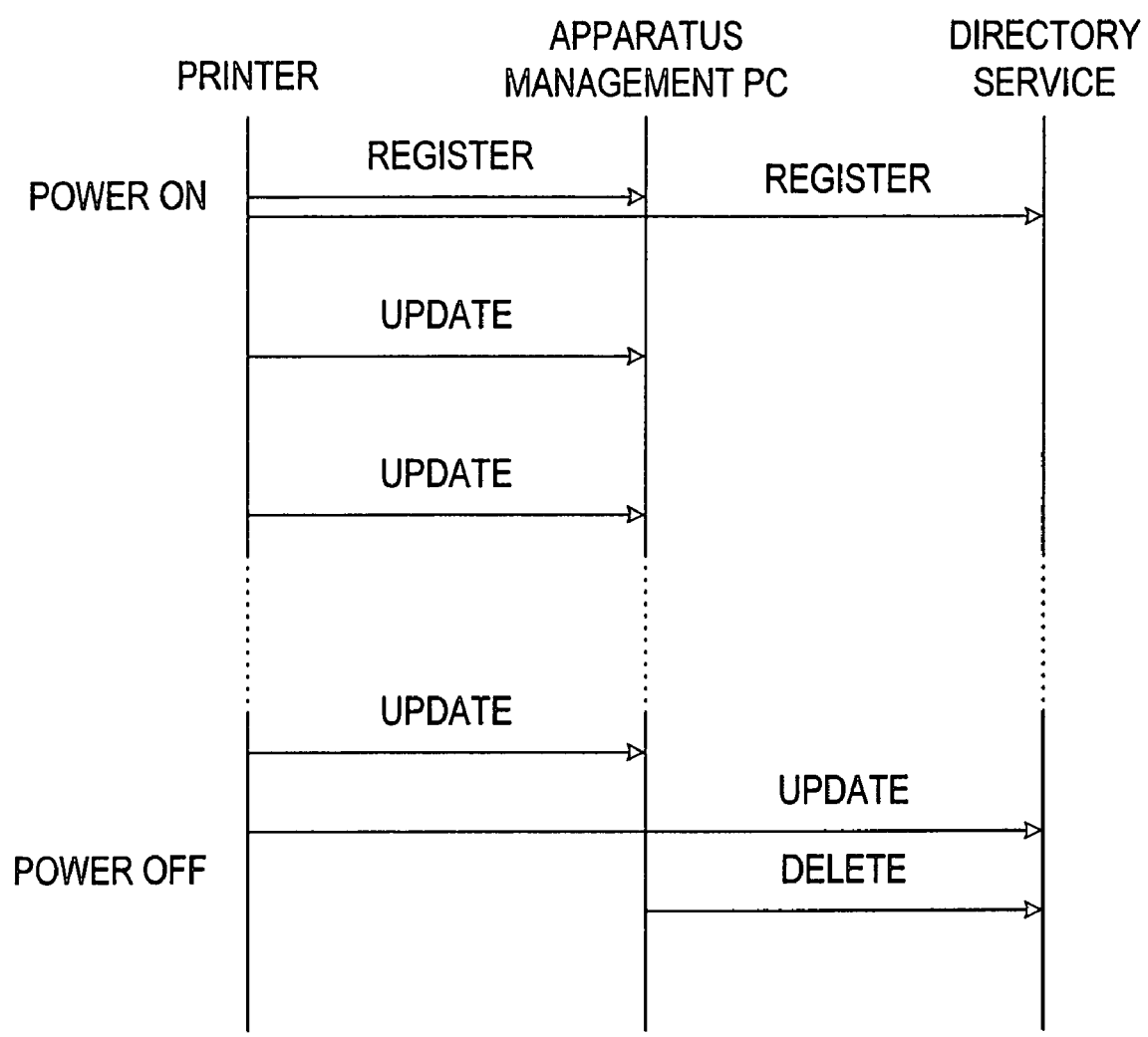
FIG. 11 is a sequence diagram explaining operation of the network system.
Figure 12:
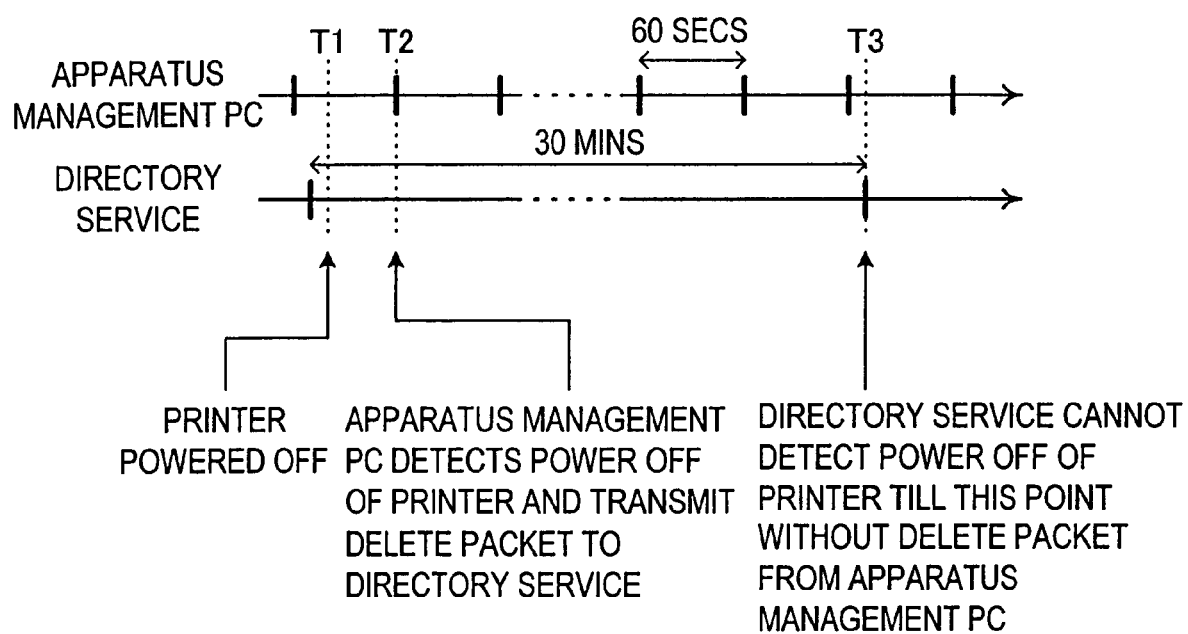
FIG. 12 is a timing chart explaining the operation of the network system.
Figure 13:
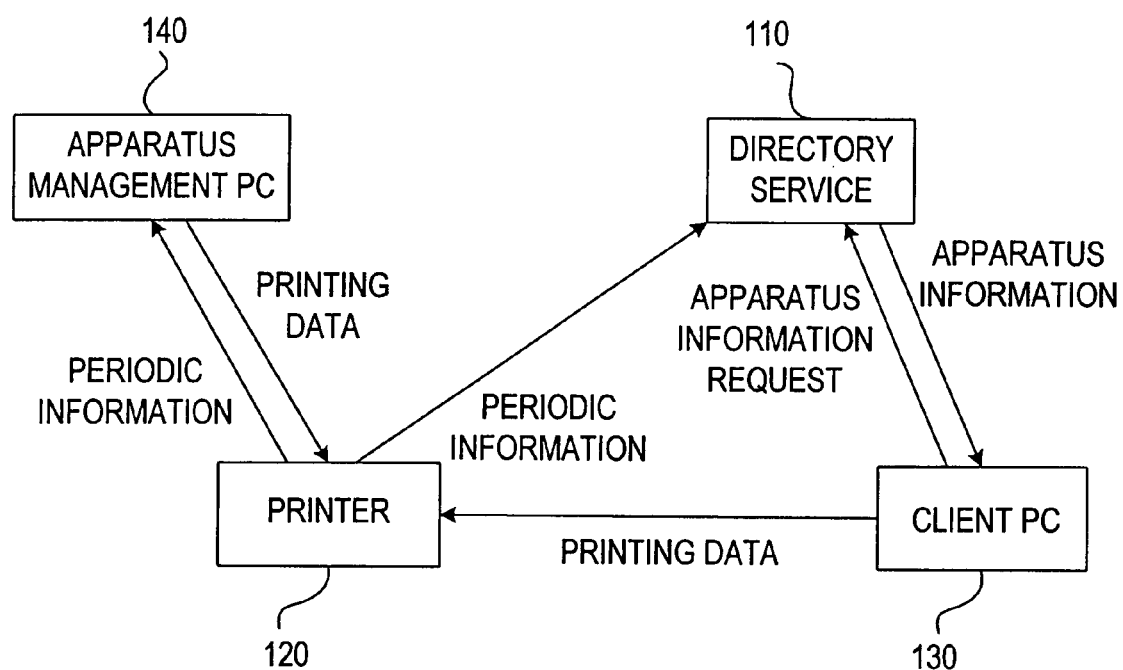
FIG. 13 is a block diagram illustrating a brief outline of communications exchanged in the conventional network system.

Operation of the present network system is explained by way of FIGS. 11 and 12.

As shown in FIG. 11, when the printer 10 is powered on, the register packet is transmitted from the printer 10 to the apparatus management PC 30 and to the directory service 50, respectively (S110). From then on, the printer 10 transmits the update packet per sixty seconds to the apparatus management PC 30, and per thirty minutes to the directory service 50 (S120, S210, S220).

As a result of the transmission of the register packet from the printer 10 to the apparatus management PC 30 (S320, S330: YES), the information regarding the printer 10 which transmitted the register packet is newly added to the apparatus management database (FIG. 2) (S340). From then on, every time the printer 10 transmits the update packet to the apparatus management PC 30 (S330: NO), the information regarding the printer 10 registered in the apparatus management database is updated (S350). In the apparatus management PC 30, whether the update packet which should be periodically (per sixty seconds) transmitted from each of the apparatuses registered in the apparatus management database is received is checked per one second. Thereby, it is determined whether each of the apparatuses is alive on the network (S410-S450). The information stored in the apparatus management database is displayed on the displaying part 34 according to the input operation performed in the operating part 32 of the apparatus management PC 30.

When the printer 10 transmits the register packet to the directory service 50 (S520, S530: YES), the information regarding the printer 10 which transmitted the register packet is newly added to the DS database (not shown) (S540). From then on, every time the update packet is transmitted from the printer 10 to the directory service 50 (S550: YES), the information regarding the printer 10 stored in the DS database is updated (S560). In the directory service 50, whether the update packet periodically (per thirty minutes) transmitted from the respective apparatuses registered in the DS database is received is determined per one second. Thereby, it is determined whether the respective apparatuses are alive on the network (S610-S650).

When the input operation for obtaining the information regarding the apparatus is performed in the operating part 72 of the client PC 70 (S710), the apparatus information packet is transmitted to the directory service 50 (S720). The directory service 50 transmits the information requested by the apparatus information packet to the client PC 70 (S570: N0, S590), and the information is listed on the displaying part 74 of the client PC 70 (S730, S740).

Under such conditions, if the printer 10 is suddenly powered off as shown in the lower part of FIG. 11, the update packet is no longer transmitted from the printer 10 to the apparatus management PC 30 and to the directory service 50. Assuming that the printer 10 was powered off right after the update packet was transmitted to the directory service 50 (T1 in FIG. 12), and that the directory service 50 can only detect disconnection of the printer 10 from the network based on the update packet transmitted from the printer 10, the directory service 50 cannot detect the disconnection until it is determined that the next update packet from the printer 10 has not been received (T3 in FIG. 12), which is about thirty minutes later from when the printer 10 was powered off (S630: YES, S640).

However, in the network system of the present embodiment, the apparatus management PC 30 detects the disconnection of the printer 10 from the network (S430: YES) at the timing when it is determined in the apparatus management PC 30 that the update packet to be received per sixty seconds has not been received (T2 in FIG. 12). Then, the delete packet is transmitted to the directory service 50 (S440). For this reason, the directory service 50 can detect the disconnection of the printer 10 from the network (S580) at the timing when the delete packet is received (S570: YES).

The network system of the present embodiment allows the directory service 50 to detect disconnection of the apparatus which has been alive on the network from the network at early stage. Accordingly, reliability of the information managed by the directory service 50 can be improved. Furthermore, since the delete packet is transmitted from the apparatus management PC 30 to the directory service 50 only when the apparatus management PC 30 detects disconnection of the apparatus managed by the directory service 30 from the network, substantial increase in the network traffic is not caused. Especially in the present system, the delete packet from the apparatus management PC 30 is transmitted to the directory service 50 at a different timing from the timing at which the update packet from the printer 10 is received. Therefore, compared to the constitution in which the delete packet is transmitted at the same timing as the update packet, the directory service 50 can efficiently detect disconnection of the apparatus from the network. In addition, the information regarding the directory service 50 to which the delete packet for the printer 10 should be transmitted is transmitted to the apparatus management PC 30 from the printer 10. Therefore, even if there are a plurality of directory services, for example, the apparatus management PC 30 can easily identify the destination of the delete packet per apparatus.

So far, an embodiment of the present invention has been described. However, the present invention should not be limited to the embodiment described above, and other modifications and variations may be possible.

For instance, in the network system of the above embodiment, each of the apparatus management PC 30 and the directory service 50 detects disconnection of the monitored apparatus from the network when it is determined that the update packet to be transmitted from the apparatus on the network at certain intervals has not been received. However, the timing at which the update packet is transmitted may not be limited to certain intervals. That is, if the apparatus management PC 30 and the directory service 50 are aware of the rules of at which timing the update packet is transmitted, the detection of disconnection is possible in the same manner.

In the network system of the above embodiment, the delete packet is transmitted only from the apparatus management PC 30 to the directory service 50. However, the network system may be so designed that the delete packet may be transmitted to both ways, for example.

Furthermore, the disconnection of the network apparatus such as the printer 10 from the network may not only be notified from the apparatus management PC 30 to the directory service 50 by way of the delete packet, but by way of using the information regarding the directory service 50, such as the type of protocol to be used for communication with the directory service 50, contained in the register packet initially sent to the apparatus management PC 30 from the network apparatus. The type of protocol for communication with the directory service 50 may be specified by an input from a keyboard provided with the apparatus management PC 30 as well.

Moreover, in the network system of the above embodiment, when the apparatus management PC 30 detects a change in the state such that the apparatus that has been alive on the network is disconnected from the network, it notifies the directory service 50 of the disconnection by transmitting the delete packet. However, other changes in the state may also be notified. For example, in a network system in which the apparatus management PC 30 and the directory service 50 manage status information of apparatuses, if the directory service 50 is notified of a status change when the apparatus management PC 30 detects the status change (for example, occurrence of an error, etc.) in the apparatus on the network, early detection of occurrence of an error, etc. by the directory service 50 becomes possible.

What is claimed is:

1. A network system comprising:
a plurality of monitoring apparatus for determining a state of a monitored apparatus based on monitored apparatus information received from the monitored apparatus via a network, the plurality of monitoring apparatus including a first monitoring apparatus and a second monitoring apparatus, the first monitoring apparatus receiving the monitored apparatus information at a first time, the second monitoring apparatus receiving the monitored apparatus information at a second time, and the second time being different from the first time,
wherein:
the first monitoring apparatus is designed to transmit state information, indicating the state of the monitored apparatus, to the second monitoring apparatus, when the first monitoring apparatus detects a change in the state of the monitored apparatus,
the second monitoring apparatus is designed to determine the state of the monitored apparatus based on the monitored apparatus information and the state information,
the first monitoring apparatus is designed to transmit specific state information, indicating that the monitored apparatus is disconnected from the network, when the first monitoring apparatus does not receive the monitored apparatus information to be received at the first time from the monitored apparatus, and
the second monitoring apparatus is designed to determine that the monitored apparatus is disconnected from the network when the second monitoring apparatus receives the specific state information and when the second monitoring apparatus does not receive the monitored apparatus information to be received at the second time from the monitored apparatus.

2. The network system as set forth in claim 1,
wherein the monitored apparatus is designed to transmit destination apparatus information, indicating the second monitoring apparatus to which the state information should be transmitted, to the first monitoring apparatus to which the monitored apparatus transmits the monitored apparatus information and which transmits the state information, and
wherein the first monitoring apparatus which transmits the state information is designed to transmit the state information to the second monitoring apparatus indicated in the destination apparatus information received from the monitored apparatus.

3. The network system as set forth in claim 2,
wherein the monitored apparatus is designed to transmit information regarding a transmission form of the state information that should be transmitted from the first monitoring apparatus which transmits the state information to the second monitoring apparatus indicated in the destination apparatus information, to the first monitoring apparatus which transmits the state information, and
wherein the first monitoring apparatus which transmits the state information is designed to transmit the state information to the second monitoring apparatus indicated in the destination apparatus information based on the transmission form.

4. The network system as set forth in claim 3,
wherein the monitored apparatus is a printer which receives printing instructions from a computer, the first monitoring apparatus which transmits the state information is an apparatus management computer which monitors a state of the printer, and
wherein the second monitoring apparatus indicated in the destination apparatus information is a directory service which transmits an address assigned to the printer on the network to the computer which transmits the printing instructions.

5. An information processor used as a first monitoring apparatus in a network system comprising a plurality of monitoring apparatus for determining a state of a monitored apparatus based on monitored apparatus information received from the monitored apparatus via the network, the first monitoring apparatus receiving the monitored apparatus information at a first time, the information processor comprising:
a receiving device for receiving information via the network;
a detecting device for detecting a change in the state of the monitored apparatus based on the monitored apparatus information from the monitored apparatus received by the receiving device; and
a transmitting device for transmitting state information indicating the detected state of the monitored apparatus to a second monitoring apparatus which receives the monitored apparatus information from the monitored apparatus at a second time, the second time being different from the first time at which the information processor receives the monitored apparatus information, when the detecting device detects a change in the state of the monitored apparatus,
wherein the transmitting device is designed to transmit specific state information, indicating that the monitored apparatus is disconnected from the network, when the first monitoring apparatus does not receive the monitored apparatus information at the first time from the monitored apparatus, and
wherein the second monitoring apparatus is designed to determine that the monitored apparatus is disconnected from the network when the second monitoring apparatus receives the specific state information and when the second monitoring apparatus does not receive the monitored apparatus information to be received at the second time from the monitored apparatus.

6. The information processor as set forth in claim 5, wherein the monitored apparatus is designed to transmit information regarding a transmission form of the state information which should be transmitted from the information processor to the second monitoring apparatus, to the information processor which transmits the state information, and the information processor is designed to transmit the state information to the second monitoring apparatus based on the transmission form.

7. An information processor used as a second monitoring apparatus in a network system comprising a plurality of monitoring apparatus for determining a state of a monitored apparatus based on monitored apparatus information received from the monitored apparatus via a network, the second monitoring apparatus receiving the monitored apparatus information at a second time, the information processor comprising:

a receiving device for receiving information via the network; and a determining device for determining the state of the monitored apparatus based on the monitored apparatus information from the monitored apparatus received by the receiving device and on state information indicating the state of the monitored apparatus transmitted from a first monitoring apparatus which receives the monitored apparatus information from the monitored apparatus at a first time, the first time being different from the second time at which the information processor receives the monitored apparatus information, wherein the first monitoring apparatus is designed to transmit specific state information, indicating that the monitored apparatus is disconnected from the network, when the first monitoring apparatus does not receive the monitored apparatus information at the first time from the monitored apparatus, and wherein the second monitoring apparatus is designed to determine that the monitored apparatus is disconnected from the network when the second monitoring apparatus receives the specific state information and when the second monitoring apparatus does not receive the monitored apparatus information to be received at the second time from the monitored apparatus.

8. An electronic apparatus used as a monitored apparatus in a network system comprising a plurality of monitoring apparatus for determining a state of the monitored apparatus based on monitored apparatus information received from the monitored apparatus via the network, a first monitoring apparatus, among the plurality of monitoring apparatus, transmitting state information indicating the state of the monitored apparatus to a second monitoring apparatus when the first monitoring apparatus detects a change in the state of the monitored apparatus, the second monitoring apparatus which receives the state information determining the state of the monitored apparatus based on the monitored apparatus information and the state information, the electronic device comprising:

a monitored apparatus information transmitting device for transmitting the monitored apparatus information at a first time to the first monitoring apparatus which transmits the state information and to the second monitoring apparatus which receives the state information at a second time, the second time being different from the first time, wherein the first monitoring apparatus is designed to transmit specific state information, indicating that the monitored apparatus is disconnected from the network, when the first monitoring apparatus does not receive the monitored apparatus information at the first time from the monitored apparatus, and wherein the second monitoring apparatus is designed to determine that the monitored apparatus is disconnected from the network when the second monitoring apparatus receives the specific state information and when the second monitoring apparatus does not receive the monitored apparatus information to be received at the second time from the monitored apparatus.

9. The electronic apparatus as set forth in claim 8, further comprising:

a destination apparatus information transmitting device for transmitting destination apparatus information, indicating the second monitoring apparatus to which the state information should be transmitted to the first monitoring apparatus to which the monitored apparatus information transmitting device transmits the monitored apparatus information and which transmits the state information.

10. The electronic apparatus as set forth in claim 9, wherein the electronic apparatus is designed to transmit information regarding a transmission form of the state information transmitted from the first monitoring apparatus which transmits the state information to the second monitoring apparatus which receives the state information, to the first monitoring apparatus which transmits the state information, and wherein the first monitoring apparatus which transmits the state information is designed to transmit the state information to the second monitoring apparatus which receives the state information based on the transmission form.

\* \* \* \* \*